United States Patent
Taraiya et al.

(12)

(10) Patent No.: US 6,825,266 B2
(45) Date of Patent: Nov. 30, 2004

(54) POLYCARBONATE MOLDING COMPOSITIONS AND ARTICLES WITH IMPROVED SURFACE AESTHETICS

(75) Inventors: Ajay Kumar Taraiya, Bangalore (IN); Jitendra Gupta, Chandigarh (IN); Gautam Chatterjee, Bangalore (IN); Bala Ambravaneswaran, Evansville, IN (US)

(73) Assignee: General Electric Company, Schenectady, NY (US)

( * ) Notice: Subject to any disclaimer, the term of this patent is extended or adjusted under 35 U.S.C. 154(b) by 47 days.

(21) Appl. No.: 10/331,209

(22) Filed: Dec. 30, 2002

(65) Prior Publication Data

US 2004/0127635 A1 Jul. 1, 2004

(51) Int. Cl.$^7$ ............................................. C08L 83/04
(52) U.S. Cl. ...................... 524/588; 525/464; 525/461; 524/537; 528/196
(58) Field of Search ............................... 525/464, 461; 524/588, 537; 528/196

(56) References Cited

U.S. PATENT DOCUMENTS

| | | | |
|---|---|---|---|
| 4,123,436 A | 10/1978 | Holub et al. | ............ 260/30.8 R |
| 4,839,421 A | * 6/1989 | Buysch et al. | ................. 525/67 |
| 5,100,960 A | 3/1992 | Grigo et al. | |
| 5,530,083 A | 6/1996 | Phelps et al. | |
| 6,072,011 A | 6/2000 | Hoover | ........................ 525/464 |
| 6,143,859 A | 11/2000 | Chatterjee et al. | .......... 528/196 |

FOREIGN PATENT DOCUMENTS

| | | |
|---|---|---|
| EP | 0 258 728 A2 | 3/1988 |
| EP | 0 485 837 A2 | 5/1992 |
| WO | WO 00/067004 A1 | 9/2000 |

OTHER PUBLICATIONS

Chang, C.O., Surface Defect Formation in the Injection Molding of Acrylonitrile–Styrene–Acrylate Polymers, Hanser Publisher, Munich 1996, Intern. Polymer Processing XI (1996) 1, pp. 76–81.
J.E. Travis and C.M. Baird, Plastics Southern Africa, 14, No. 5, 1985, p. 38–44.
J.F. Lacrampe, J. Pabiot, Revue Generale des Caoutchoucs and Plastiques, 2001, p. 30–37.
L.R. Cosma, vol. 1, Conference Proceedings, 1996, p. 466–469.
J.N. Rieck and E.C. Ma, TPE '92 Conference Proceedings, p. 307–314.
M. M. Gorejova et al., "Surface Behavior of Binary Polymeric Systems", Polymer Science USSR, vol. 34, No. 2, pp. 145–150, 1992.
International Search Report; International Application No. PCT/US 03/37851; International Filing Date Nov. 25, 2003; Date of Mailing Apr. 6, 2004.
Abstract for EP0485837; May 20, 1992; 1 page.
EP 0 258 728 A2; Mar. 9, 1988 Translation (26 pages).

* cited by examiner

Primary Examiner—Kuo-Liang Peng

(57) ABSTRACT

A thermoplastic polymer molding composition useful for producing an article, where the molding composition comprises a polyorganosiloxane-polycarbonate block copolymer and a flow modifier; wherein the flow modifier is at least one selected from the group consisting of a polyalkylene glycol, a low weight average molecular weight polycarbonate polymer, or mixtures thereof; and further wherein the flow modifier reduces surface imperfections when molded into the article.

22 Claims, No Drawings

POLYCARBONATE MOLDING COMPOSITIONS AND ARTICLES WITH IMPROVED SURFACE AESTHETICS

BACKGROUND

This disclosure generally relates to a thermoplastic resin molding composition comprising a polyorganosiloxane-polycarbonate block copolymer, polycarbonates, and a flow promoter for producing articles having improved surface aesthetics.

Aromatic polycarbonate polymers have found wide use as engineering thermoplastics, having inherent toughness and clarity. However, there is a need to improve the low temperature impact strength and ductility of the polycarbonate polymers. At low temperatures, brittle fractures are often a problem. Many variants of polycarbonate polymers have been evaluated to overcome these deficiencies.

One such variant is the polyorganosiloxane-polycarbonate block copolymers. These copolymers possess enhanced properties such as low temperature impact strength, low temperature ductility, improved processability, and fire retardance. The polyorganosiloxane-polycarbonate block copolymers can be advantageously blended with various proportions of aromatic polycarbonate polymers to prepare thermoplastic molding compositions capable of meeting the wide range of requirements for high and low temperature properties. These blends also exhibit other useful advantages, such as ease of achieving fire retardance. By varying the selection of the polycarbonate polymer and the proportions of blend ingredients, a wide range of properties may be obtained, starting with a single polyorganosiloxane-polycarbonate block copolymer. However, when such blends are used to produce molded articles, the articles display inferior surface aesthetics, thereby limiting their utility in a variety of applications where the blends' superior properties could otherwise be used advantageously. Hence there is a need for developing thermoplastic polymer molding compositions, which show improved surface aesthetics while also retaining the other properties, such as low temperature ductility and fire retardance.

BRIEF SUMMARY

Disclosed herein is a thermoplastic polymer molding composition comprising a polyorganosiloxane-polycarbonate block copolymer and a flow modifier, wherein said flow modifier is selected from the group consisting of a polyalkylene glycol compound, a low weight average molecular weight polycarbonate polymer, or mixtures thereof. The amount of flow modifier added should be an amount effective to reduce surface imperfections if the molding composition is molded into an article. Surface imperfections may be minimized by adding the correct amount of flow modifier. The correct amount can be determined by experimentation as shown in the Examples.

Another aspect of the disclosure is an article comprising a molding composition, wherein said molding comprises: a polyorganosiloxane-polycarbonate block copolymer; at least one polycarbonate polymer; and a flow modifier; wherein said article has a percent improvement in the shift in color index at surface imperfections of at least 10 percent relative to an otherwise similar molding composition which does not comprise said flow modifier.

Another aspect of the invention is a thermoplastic polymer molding composition useful for producing an article, wherein each 100 parts of said molding composition comprises from about 0.2 parts to about 5 parts of a flow modifier; wherein said polyorganosiloxane-polycarbonate block copolymer comprises: polyorganosiloxane blocks having the formula:

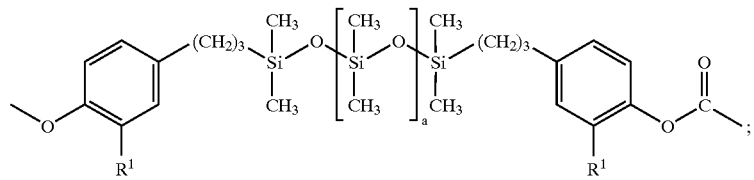

wherein $R^1$ is hydrogen, methoxy or allyl, "a" is an integer having a value from about 40 to about 55; and polycarbonate blocks having the formula:

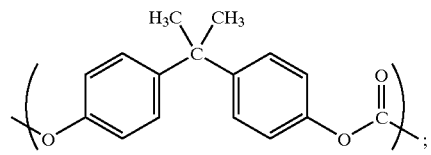

wherein said flow modifier causes minimized surface imperfections in said article.

The above-described embodiments and other features will become better understood from the detailed description that follows.

DETAILED DESCRIPTION

The present invention may be understood more readily by reference to the following detailed description of preferred embodiments of the invention and the examples included therein. In the following specification and the claims which follow, reference will be made to a number of terms which shall be defined to have the following meanings:

The singular forms "a", "an" and "the" include plural referents unless the context clearly dictates otherwise. "Optional" or "optionally" means that the subsequently described event or circumstance may or may not occur, and that the description includes instances where the event occurs and instances where it does not.

The term "hydrocarbyl" as used herein means the monovalent moiety obtained upon removal of a hydrogen atom from a parent hydrocarbon. Representative of hydrocarbyl are alkyl of 1 to 25 carbon atoms, inclusive such as methyl, ethyl, propyl, butyl, pentyl, hexyl, heptyl, octyl, nonyl, undecyl, decyl, dodecyl, octadecyl, nonadecyl eicosyl, heneicosyl, docosyl, tricosyl, tetracosyl, pentacosyl and the isomeric forms thereof; aryl of 6 to 25 carbon atoms, inclusive, such as phenyl, tolyl, xylyl, napthyl, biphenyl, tetraphenyl and the like; aralkyl of 7 to 25 carbon atoms, inclusive, such as benzyl, phenethyl, phenpropyl, phenbutyl, phenhexyl, napthoctyl and the like; cycloalkyl of 3 to 8 carbon atoms, inclusive, such as cyclopropyl, cyclobutyl, cyclopentyl, cyclohexyl, cycloheptyl, cyclooctyl and the like.

The term "alkylene" means the divalent moiety obtained on removal of two hydrogen atoms, each from a non-adjacent carbon atom of a parent hydrocarbon and includes alkylene of 3 to 15 carbon atoms, inclusive, such as 1,3-propylene, 1,4-butylene, 1,5-pentylene, 1,8-octylene, 1,10-decylene and the like.

The term "halogen-substituted hydrocarbyl" as used herein means the hydrocarbyl moiety as previously defined wherein one or more hydrogen atoms have been replaced with halogen (chlorine, bromine, iodine, fluorine). Throughout the disclosure, the term "° C." indicates degrees Celsius.

The term "alkyl" as used in the various embodiments of the present disclosure is intended to designate straight chain alkyls, branched alkyls, aralkyls, cycloalkyls, and bicycloalkyl radicals. The straight chain and branched alkyl radicals, unless otherwise specified, are those containing about 1 to about 40 carbon atoms, and include as illustrative non-limiting examples methyl, ethyl, n-propyl, isopropyl, n-butyl, sec-butyl, tertiary-butyl, pentyl, neopentyl, hexyl, heptyl, octyl, nonyl, decyl, undecyl and dodecyl. In various embodiments, cycloalkyl radicals represented are those containing about 3 to about 12 ring carbon atoms. Some illustrative non-limiting examples of these cycloalkyl radicals include cyclobutyl, cyclopentyl, cyclohexyl, methylcyclohexyl, and cycloheptyl. In various embodiments, aralkyl radicals are those containing about 7 to 14 carbon atoms; these include, but are not limited to, benzyl, phenylbutyl, phenylpropyl, and phenylethyl. In various other embodiments, aromatic radicals used in the present disclosure are intended to designate monocyclic or polycyclic moieties containing about 6 to about 12 ring carbon atoms. These aryl groups may also contain one or more halogen atoms or alkyl groups substituted on the ring carbons. In most embodiments, any substituent present is not in a ring position that would prevent an appropriate aromatic radical, such as in a phenolic aromatic radical, from reacting with an appropriate olefinic group, such as in a monoterpene. Some illustrative non-limiting examples of these aromatic radicals include phenyl, halophenyl, biphenyl, and naphthyl. In another embodiment, aromatic radicals used in the present disclosure are intended to designate aralkyl radicals containing about 7 to 14 carbon atoms.

The polyorganosiloxane-polycarbonate block copolymer comprises polyorganosiloxane blocks having the formula (I):

where $R^2$ and $R^3$ are each independently hydrogen, hydrocarbyl or halogen-substituted hydrocarbyl; "b" is an integer from about 10 to about 120, and $R^4$ is hydrogen, hydrocarbyl, hydrocarbyloxy or halogen; and polycarbonate blocks having the formula (II):

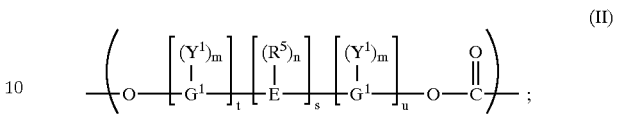

where $G^1$ is an aromatic group; E is an alkylene, an alkylidene, a cycloaliphatic group; a sulfur-containing linkage, a phosphorus-containing linkage; an ether linkage, a carbonyl group, or a tertiary nitrogen group, wherein $R^5$ is a hydrogen or a monovalent hydrocarbon group; wherein $Y^1$ is selected from the group consisting of monovalent hydrocarbon group, alkenyl, allyl, halogen, bromine, chlorine; nitro; wherein "m" represents any integer from and including zero through the number of positions on $G^1$ available for substitution; wherein "n" represents an integer from and including zero through the number of positions on E available for substitution; wherein "t" represents an integer equal to at least one; wherein "s" is either zero or one; and wherein "u" represents any integer including zero.

The polyorganosiloxane blocks of the block copolymer comprise from about 3 parts to about 8 parts per 100 parts of the molding composition, and the polycarbonate blocks of the block copolymer comprise from about 92 parts to about 96 parts per 100 parts of the molding composition. The integer "b" has a value from about 30–70 in one embodiment, and from about 40–55 in another embodiment. In an embodiment, the $R^2$ and $R^3$ groups are each methyl; and in another embodiment, $R^2$ is a methyl, and $R^3$ is a phenyl. The weight average molecular weight of the block copolymer is from about 20,000 to about 80,000 in one embodiment, and from about 30,000 to about 60,000 in another embodiment.

The block copolymers of the invention are prepared by the reaction of a carbonate forming precursor, such as phosgene, with at least one bisphenol of the formula (III):

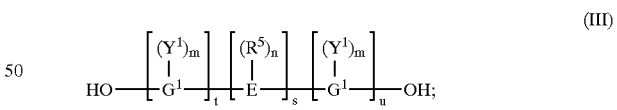

where $G^1$, E, $R^5$, $Y^1$, "m", "n", "t", "s", and "u" are as defined above; and a siloxane diol of the formula (IV):

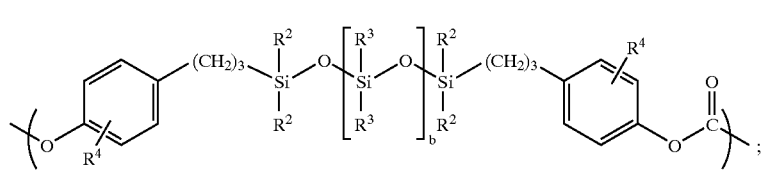

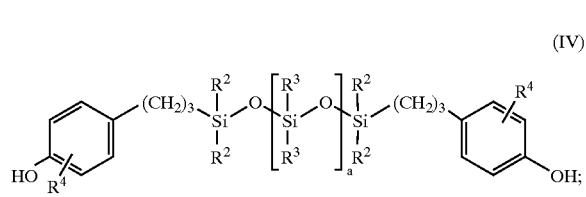

(IV)

where $R^2$, $R^3$, $R^4$ and "b" are the same as described above. In a particular embodiment, the siloxane diol has the formula where $R^2$ and $R^3$ is each a methyl, $R^4$ is a methoxy or an allyl ortho to the phenolic hydroxyl, and "b" is about 30 to about 70. In another embodiment, the siloxane diol has the formula where $R^2$ and $R^3$ is each a methyl, $R^4$ is a hydrogen, methoxy or allyl ortho to the phenolic hydroxyl, and "b" is about 40 to about 55.

In the bisphenol of formula (III), $G^1$ represents an aromatic group, such as phenylene, biphenylene, naphthylene, and the like aromatic groups. E may be an alkylene or alkylidene group such as methylene, ethylene, ethylidene, propylene, propylidene, isopropylidene, butylene, butylidene, isobutylidene, amylene, amylidene, isoamylidene, and the like. Alternatively, E may consist of two or more alkylene or alkylidene groups connected by a moiety different from alkylene or alkylidene, such as an aromatic linkage, a tertiary amino linkage, an ether linkage, a carbonyl linkage, a sulfur-containing linkage such as sulfide, sulfoxide, sulfone, a phosphorus-containing linkage such as phosphinyl, phosphonyl, and like linkages. In addition, E may comprise a cycloaliphatic group. $R^5$ represents hydrogen or a monovalent hydrocarbon group such as alkyl, aryl, aralkyl, alkaryl, cycloalkyl, and the like. $Y^1$ comprises a halogen (e.g., fluorine, bromine, chlorine, iodine, and the like); a nitro group; an alkenyl group, allyl group, the same as $R^5$ previously described, an oxy group such as OR, and the like. In a preferred embodiment, $Y^1$ is inert to and unaffected by the reactants and reaction conditions used to prepare the polymer. The letter "m" represents any integer from and including zero through the number of positions on $G^1$ available for substitution; "p" represents an integer from and including zero through the number of positions on E available for substitution; "t" represents an integer equal to at least one; "s" is either zero or one; and "u" represents any integer including zero.

Examples of the bisphenol used for producing the polycarbonate block of the copolymer include, but are not intended to be limited to those selected from the group consisting of 4,4'-(3,3,5-trimethylcyclohexylidene) diphenol, 4,4'-bis (3,5-dimethyl)diphenol, 1,1-bis(4-hydroxy-3-methylphenyl)cyclohexane, 4,4-bis(4-hydroxyphenyl)heptane, 2,4'-dihydroxydiphenylmethane, bis(2-hydroxyphenyl)methane, bis(4-hydroxyphenyl) methane, bis(4-hydroxy-5-nitrophenyl)methane, bis(4-hydroxy-2,6-dimethyl-3-methoxyphenyl)methane, 1,1-bis (4-hydroxyphenyl)ethane, 1,1-bis(4-hydroxy-2-chlorophenyl)ethane, 2,2-bis(4-hydroxyphenyl)propane, 2,2-bis(3-phenyl-4-hydroxyphenyl)propane, 2,2-bis(4-hydroxy-3-methylphenyl)propane, 2,2-bis(4-hydroxy-3-ethylphenyl)propane, 2,2-bis(4-hydroxy-3-isopropylphenyl) propane, 2,2-bis(4-hydroxy-3,5-dimethylphenyl)propane, 2,2-bis(3,5,3',5'-tetrachloro-4,4'-dihydroxyphenyl)propane, bis(4-hydroxyphenyl)cyclohexylmethane, 2,2-bis(4-hydroxyphenyl)-1-phenylpropane, 2,4'-dihydroxyphenyl sulfone, 2,6-dihydroxy naphthalene; hydroquinone; resorcinol, $C_{1-3}$ alkyl-substituted resorcinols, 3-(4-hydroxyphenyl)-1,1,3-trimethylindan-5-ol, 2-(4-hydroxyphenyl)-1,3,3-trimethylindan-5-ol, 2,2,2',2'-tetrahydro-3,3,3',3'-tetramethyl-1,1'-spirobi[1H-indene]-6,6'-diol, 1-methyl-1,3-bis(4-hydroxyphenyl)-3-isopropylcyclohexane, 1-methyl-2-(4hydroxyphenyl)-3-[1-(4-hydroxyphenyl)isopropyl]cyclohexane, and combinations thereof; and combinations comprising at least one of the foregoing aromatic dihydroxy compounds.

Suitable examples of E include cyclopentylidene, cyclohexylidene, 3,3,5-trimethylcyclohexylidene, methylcyclohexylidene, 2-[2.2.1]-bicycloheptylidene, neopentylidene, cyclopentadecylidene, cyclododecylidene, adamantylidene, etc.); a sulfur-containing linkage such as sulfide, sulfoxide or sulfone, a phosphorus-containing linkage such as phosphinyl, phosphonyl, an ether linkage, a carbonyl group, and a tertiary nitrogen group.

In the bisphenol shown in formula (III), when more than one $Y^1$ substituent is present, they may be the same or different. The same holds true for the $R^5$ substituent. Where "s" is zero in formula (III) and "u" is not zero, the aromatic rings are directly joined with no intervening alkylidene or other bridge. The positions of the hydroxyl groups and $Y^1$ on the aromatic nuclear residues $G^1$ can be varied in the ortho, meta, or para positions and the groupings can be in vicinal, asymmetrical or symmetrical relationship, where two or more ring carbon atoms of the hydrocarbon residue are substituted with $Y^1$ and hydroxyl groups. In some embodiments, the parameters "t", "s", and "u" are each one; both $G^1$ radicals are unsubstituted phenylene radicals; and E is an alkylidene group such as isopropylidene. In particular embodiments, both $G^1$ radicals are p-phenylene, although both may be ortho- or meta-phenylene or one ortho- or meta-phenylene and the other para-phenylene.

The polyorganosiloxane-polycarbonate block copolymers may be prepared from the siloxane diols (IV) and the bisphenols (III) by known processes for making polycarbonates, such as the methods described in U.S. Pat. No. 4,123,436, where a dihydric phenol is reacted with a carbonate precursor, advantageously phosgene; or by transesterification processes, such as those disclosed in U.S. Pat. No. 3,154,008, and other processes known to those skilled in the art.

In an embodiment, the thermoplastic polymer molding composition further comprises at least one polycarbonate polymer. The polycarbonate polymer can be a homopolymers, a copolymer, or mixtures thereof. More particularly, the polycarbonate polymer is not a polyorganosiloxane-polycarbonate block copolymer of the type described by formula (I). The polycarbonate polymer generally has a weight average molecular weight, from about 20,000 to about 80,000. In several embodiments, the polycarbonate polymer has a weight average molecular weight from about 30,000 to about 45,000, from about 40,000 to 42,000, from about 55,000 to about 65,000, and from about 58,000 to about 60,000.

The polycarbonate polymer comprises structural units derived from at least one bisphenol of the formula (III) as previously described. Examples of bisphenols that can be used as a building block for producing the polycarbonate polymer include, but are not intended to be limited to those selected from the group consisting of 4,4'-(3,3,5-trimethylcyclohexylidene)diphenol, 4,4'-bis(3,5-dimethyl) diphenol, 1,1-bis(4-hydroxy-3-methylphenyl)cyclohexane, 4,4-bis(4-hydroxyphenyl)heptane, 2,4'-dihydroxydiphenylmethane, bis(2-hydroxyphenyl)methane, bis(4-hydroxyphenyl)methane, bis(4-hydroxy-5-nitrophenyl)methane, bis(4-hydroxy-2,6-dimethyl-3-methoxyphenyl)methane, 1,1-bis(4-hydroxyphenyl)ethane, 1,1-bis(4-hydroxy-2-chlorophenyl)ethane, 2,2-bis(4- hydroxyphenyl)propane, 2,2-bis(3-phenyl-4-hydroxyphenyl)propane, 2,2-bis(4-hydroxy-3-methylphenyl)propane, 2,2-bis(4-hydroxy-3-ethylphenyl) propane, 2,2-bis(4-hydroxy-3-isopropylphenyl)propane, 2,2-bis(4-hydroxy-3,5-dimethylphenyl)propane, 2,2-bis(3,5,3',5'-tetrachloro-4,4'-dihydroxyphenyl)propane, bis(4-hydroxyphenyl)cyclohexylmethane, 2,2-bis(4-hydroxyphenyl)-1-phenylpropane, 2,4'-dihydroxyphenyl sulfone, 2,6-dihydroxy naphthalene; hydroquinone; resorcinol, $C_{1-3}$ alkyl-substituted resorcinols, 3-(4-hydroxyphenyl)-1,1,3-trimethylindan-5-ol, 1-(4-hydroxyphenyl)-1,3,3-trimethylindan-5-ol, 2,2,2',2'-tetrahydro-3,3,3',3'-tetramethyl-1,1'-spirobi[1H-indene]-6,6'-diol, 1-methyl-1,3-bis(4-hydroxyphenyl)-3-isopropylcyclohexane, 1-methyl-2-(4-hydroxyphenyl)-3-[1-(4-hydroxyphenyl)isopropyl]cyclohexane, and combinations thereof; and combinations comprising at least one of the foregoing aromatic dihydroxy compounds.

When a molding composition comprising the aforementioned polyorganosiloxane-polycarbonate block copolymer and optionally the polycarbonate polymer, but which does not comprise the flow modifier is molded using a molding machine, the molded articles thus produced exhibit surface imperfections. The surface imperfection comprises one or more knit lines and gate blushes. Gate blush is a surface imperfection that appears as a discoloration in the gate area of an injection-molded article. A mold having a mold gate and an insert can be used to visualize the gate blush and the knit lines. As the molten polymer enters and flows through the mold gate, the gate blush is formed as a series of curves about the mold gate. As the molten polymer front moves forward past the mold insert, the separate melt fronts on either side of the insert meet to form the knit line. Finally, when the molten polymer front moves further ahead and fills the entire mold, the knit line can be seen as a line originating at the mold insert and running along the length of the mold. Without wishing to be bound by any theory of operation, it is believed that the surface imperfections, such as knit line and gate blush, are caused by a mismatch in the viscosity of a siloxane-rich domain and a siloxane-deficient domain present in the molding composition. This surface enrichment phenomenon is discussed, for example, in the article Surface Behavior of Binary Polymeric Systems, Polymer Science USSR, Goroleva et al., Vol. 34, 145–150 (1991). Generally the surface imperfections are seen more prominently in molded articles having darker colors.

When a molding composition comprising the aforementioned polyorganosiloxane-polycarbonate block copolymer, optionally the polycarbonate polymer, and a flow modifier is molded using a molding machine, the molded articles have minimized surface imperfections of the types described previously. Furthermore, the addition of the flow modifiers does not substantially affect the other properties of the molding composition, such as low temperature impact and ductility, and fire retardance. Although the invention is not limited by any theory of operation, it is believed that the flow modifier reduces the viscosity mismatch between a siloxane-rich domain and a siloxane-deficient domain in the molding composition, thereby minimizing phase separation between the two aforementioned domains.

The BORG spectrophotometric technique as described in World Patent Application No. 0067004 A1, which is hereby incorporated by reference herein can measure the surface imperfection described hereinabove. In this technique, a spatially resolved spectrophotometer is used to measure surface imperfections in molded plastic parts produced using a molding tool with various mold inserts The mold inserts produce certain desired topological surface features upon these sample plastic parts. The measurements from one or more of these sample plastic parts are then provided to a computerized device, which appropriately filters the data and calculates overall data shape, average peak and valley shift, and a quality number indicative of data slopes. In this method, a sample molded part is mounted on a sample holder that is optionally mounted on motorized translation stages, so as to scan across the feature of interest on the sample surface. A computerized device automates the motion system and data collection, and transforms the raw data into color coordinates. This data is processed by taking into consideration the instrument calibration data obtained beforehand, and allows the user to optimize the signal to noise by allowing adjustment of key parameters. The instrument then calculates the difference in the color index between the lightest and darkest points across a streaked region.

Surface imperfections are typically detected by measurement of a reduction in the color index (hereinafter sometimes referred to as "L") which corresponds physically to the imperfection (e.g., the gate blush and/or the knit line). Molded plaques are prepared from different molding compositions and their color index is measured typically by scanning in a generally linear direction across the plaque such that the BORG spectrometer detector typically encounters two or three different knit line regions in the plaque separated by bulk regions. The color index is typically lower in the knit line region. A physical imperfection is visible to the naked eye if the color index is sufficiently lower in the knit line region in comparison with the bulk region. If, for a sample material, $L_{knit}^{sample}$ denotes the color index at a surface imperfection, and $L_{bulk}^{sample}$ denotes the color index away from the surface imperfection, then the shift in color index ($\Delta L_S$) is given by equation (1):

$$\Delta L_s = L_{bulk}^{sample} - L_{knit}^{sample} \tag{1}$$

Similarly, for a control sample, if $L_{knit}^{control}$ denotes the color index at a surface imperfection, and $L_{bulk}^{control}$ denotes the color index away from the imperfection, the shift in color index (($\Delta L_C$) is given by equation (2):

$$\Delta L_c = L_{bulk}^{control} - L_{knit}^{control} \tag{2}$$

The percent improvement in the shift in color index ($\Delta L$) for a sample versus its control is then given by equation (3):

$$\Delta L = \frac{\Delta L_c - \Delta L_s}{\Delta L_c} \times 100 \tag{3}$$

In an embodiment, the minimized surface imperfection comprises a reduction in the color index measured at the surface imperfections. The reduction in the shift in color index, as measured by the BORG spectrophotometric technique, is at least about 20 percent relative to an otherwise similar molding composition that does not comprise the flow modifier. Generally, the darker the color of the molded part, the more easily surface imperfections due to gate blushes and knit lines can be visualized. Generally, if darker dyes or pigments, such as black, brown, etc., are added to the formulation, compositions having a $\Delta L_C$ greater than about 10 percent have visible surface imperfections. As mentioned above, these blends are highly desirable for their enhanced low temperature properties while retaining the fire retardance properties, in comparison to otherwise similar compositions that only contain polycarbonate.

The processibility of a thermoplastic polymer composition can be expressed, for example, by its melt volume rate (hereinafter sometimes referred to as "MVR") value. In the present disclosure, MVR is defined as the volume of a sample that passes though an orifice with a piston when a sample of about 6–7 grams of the sample is placed under a constant load of 6.7 kilograms at about 300° C. and a dwell time of about of 4 minutes. A higher value generally means the polymer composition is easier to process. For example, the thermoplastic polymer composition comprising about 39 parts of bisphenol A homopolycarbonate having a weight average molecular weight of about 39,000, about 39 parts of bisphenol A homopolycarbonate having a weight average molecular weight of about 57,000, and about 22 parts of a polyorganosiloxane-polycarbonate block copolymer having a weight average molecular weight of about 57,000, and represented by the formula (VI):

ethylphenyl)propane, 2,2-bis(4-hydroxy-3-isopropylphenyl) propane, 2,2-bis(4-hydroxy-3,5-dimethylphenyl)propane, 2,2-bis(3,5,3',5'-tetrachloro-4,4'-dihydroxyphenyl)propane, bis(4-hydroxyphenyl)cyclohexylmethane, 2,2-bis(4-hydroxyphenyl)-1-phenylpropane, 2,4'-dihydroxyphenyl sulfone, 2,6-dihydroxy naphthalene; hydroquinone; resorcinol, $C_{1-3}$ alkyl-substituted resorcinols, 3-(4-hydroxyphenyl)-1,1,3-trimethylindan-5-ol, 1-(4-hydroxyphenyl)-1,3,3-trimethylindan-5-ol, 2,2,2',2'-tetrahydro-3,3,3',3'-tetramethyl-1,1'-spirobi[1H-indene]-6, 6'-diol, 1m,ethyl-1,3-bis(4-hydroxyphenyl)-3-isopropylcyclohexane, 1-methyl-2-(4-hydroxyphenyl)-3-[1-(4-hydroxyphenyl)isopropyl]cyclohexane, and combinations thereof; and combinations comprising at least one of the foregoing bisphenols. In particular embodiments,

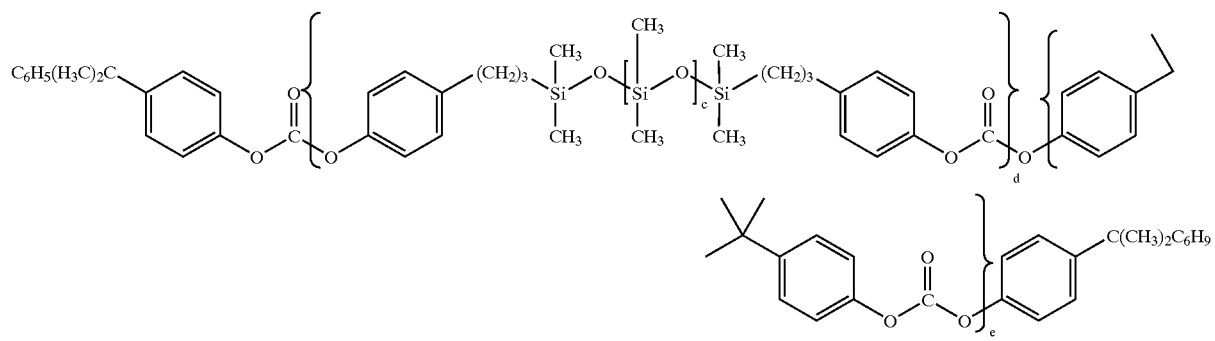

(VI)

has a MVR of about 9.2 cubic centimeters/10 minutes in the absence of a flow modifier. In the example of the block copolymer represented by formula (VI), the values of "c", "d" and "e" are such that the copolymer has a weight average molecular weight of about 57,000. However, the above polymer composition when combined with about 0.5 parts of a flow modifier selected from a polyethylene glycol having a number average molecular weight of about 200 displays a MVR of about 28. The MVR of the thermoplastic polymer molding composition disclosed herein is from about 15 to about 60, in one embodiment, and from about 15 to about 45 in another embodiment.

Flow modifiers that result in a minimized surface imperfection in the molded article are selected from the group consisting of a polyalkylene glycol compound, a low molecular weight polycarbonate polymer, or mixtures thereof. These flow modifiers are advantageous due to low cost and ready availability.

The low molecular weight polycarbonate comprising the flow modifier has a weight average molecular weight from about 1,000 to about 10,000 in one embodiment, and from about 3,000 to about 8,000 in another embodiment. In other embodiments, the low molecular weight polycarbonate is one derived from a bisphenol selected from the group consisting of 4,4'-(3,3,5-trimethylcyclohexylidene) diphenol, 4,4'-bis(3,5-dimethyl)diphenol, 1,1-bis(4-hydroxy-3-methylphenyl)cyclohexane, 4,4-bis(4-hydroxyphenyl)heptane, 2,4'-dihydroxydiphenylmethane, bis(2-hydroxyphenyl)methane, bis(4-hydroxyphenyl) methane, bis(4-hydroxy-5-nitrophenyl)methane, bis(4-hydroxy-2,6-dimethyl-3-methoxyphenyl)methane, 1,1-bis (4-hydroxyphenyl)ethane, 1,1-bis(4-hydroxy-2-chlorophenyl)ethane, 2,2-bis(4-hydroxyphenyl)propane, 2,2-bis(3-phenyl-4-hydroxyphenyl)propane, 2,2-bis(4-hydroxy-3-methylphenyl)propane, 2,2-bis(4-hydroxy-3- the flow modifier is a low molecular weight bisphenol A homopolycarbonate having a weight average molecular weight from about 1,000 to about 10,000; and from about 3,000 to about 8,000.

The polyalkylene glycols that function as a flow modifier polyalkylene glycol compound have a repeat unit having the formula (VII):

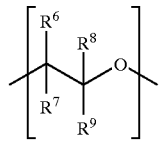

(VII)

wherein $R^6$, $R^7$, $R^8$, and $R^9$ each independently represents a hydrogen or a $C_1$–$C_4$ alkyl radical; and terminal groups selected from $OR^{10}$, wherein $R^{10}$ is hydrogen, $C_1$–$C_4$ hydrocarbyl. Polyalkylene glycols and corresponding derivatives that are obtained by functionalized of the terminal hydroxy groups (hereinafter collectively referred to as "polyalkylene glycol compound") are generally available as materials having a range of molecular weights. Polyalkylene glycols, such as for example, polyethylene glycol and polypropylene glycol are generally prepared commercially by ring-opening polymerization of ethylene oxide and propylene oxide, respectively, by water. The polyethylene glycols and polypropylene glycols thus obtained have a distribution of chain lengths, and therefore a distribution of molecular weights. The molecular weights of these materials are generally expressed by a number average molecular weight, hereinafter sometimes referred to as "$M_n$". Therefore, the polyalkylene glycol compound can be expressed by the general formula (VIII):

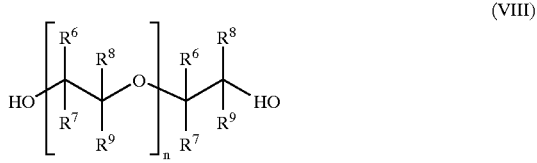

(VIII)

wherein "n" is the average chain length. The value of "n" is such that it satisfies the number average molecular weight of any polyalkylene glycol.

In an embodiment, the flow modifier is a polyalkylene glycol selected from the group consisting of a polyethylene glycol, a polypropylene glycol, or mixtures thereof. In an embodiment, the flow modifier is a polyethylene glycol having a number average molecular weight from about 200 to about 2000. More particularly, the flow modifier is a polyethylene glycol having a number average molecular weight from about 200 to about 800.

The thermoplastic polymer molding composition of the disclosure comprises from about 0.05 parts to about 20 parts of the flow modifier, per 100 parts of the molding composition in one embodiment, and from 0.5 parts to about 10 parts of the flow modifier in another embodiment. More particularly, the thermoplastic polymer molding composition of the disclosure comprises from about 0.05 parts to about 5 parts of the flow modifier, per 100 parts of the molding composition The approaches described above can be advantageously utilized for preparing thermoplastic polymer molding compositions comprising a bisphenol A homopolycarbonate having a weight average molecular weight from about 30,000 to about 60,000, a flow modifier, and a polyorganosiloxane-polycarbonate block copolymer (VIII) having polyorganosiloxane blocks represented by the formula (IX):

thereof. The low molecular weight bisphenol A polycarbonate can be prepared by methods known in the art, such as interfacial polymerization method using phosgene, bischloroformate polymerization method using bisphenol A bischloroformate, and melt polymerization method using bisphenol A and a diaryl carbonate, such as diphenyl carbonate. Furthermore, the polycarbonates produced by the methods described above can have hydroxy, aryloxy, or chloroformate end groups. In an embodiment, the low molecular weight bisphenol A polycarbonate has a weight average molecular weight from about 3,000 to about 8,000 and has end groups selected from phenoxy, hydroxy, or combinations thereof. A low molecular weight bisphenol A homopolycarbonate having a weight average molecular weight of about 8,000 can be produced by reacting bisphenol A with diphenylcarbonate in a melt polycondensation process, such as, for example, shown in Example 1.

Typical polyalkylene glycols, such as polyethylene glycols and polypropylene glycols are formed by addition of ethylene oxide and/or propylene oxide to varied functional molecules (in general polyvalent alcohols), which serve to initiate the ring opening polymerization. By varying the structure and relative ratio of the initiator and polymerizing monomer, a variety of polyether polyols can be prepared with control over important properties like number average molecular weight, melting point, hydrophilicity, and compatibility.

The thermoplastic polymer molding composition of the disclosure may also contain one or more antioxidants, heat stabilizers, ultraviolet (hereinafter referred to as "UV") stabilizers, fire retardants, and colorant compositions. The phenolic antioxidants useful in the instant compositions embrace a large family of compounds, examples of which are given below. Non-limiting examples of antioxidants that can be used in the molding composition of the disclosure include tris(24-di-tert-butylphenyl)phosphite, 3,9-di(2,4-di-

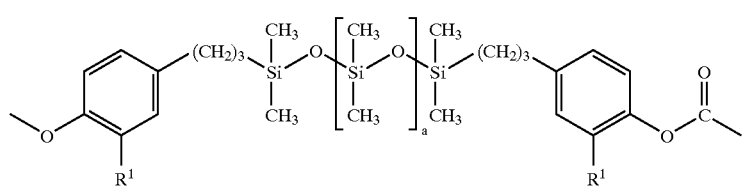

(IX)

wherein $R^1$ is hydrogen, methoxy or allyl, "a" is an integer having a value from about 40 to about 55; and polycarbonate blocks having the formula (X):

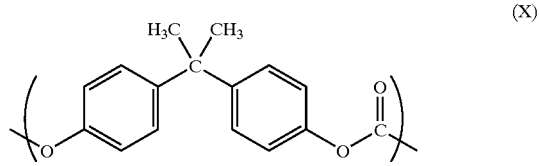

(X)

wherein said flow modifier causes minimized surface imperfections in the article.

The flow modifier useful for minimizing surface imperfections in molded articles comprising the block copolymer of formula (VII) is selected from the group consisting of a low molecular weight bisphenol A homopolycarbonate having a weight average molecular weight from about 3,000 to about 8,000, a polyethylene glycol having a number average molecular weight from about 200 to about 3000; or mixtures tert-butylphenoxy)-2,4,8,10-tetraoxa-3,9-diphosphaspiro [5.5]undecane, 3,9-di(2,4-dicumylphenoxy)-2,4,8,10-tetraoxa-3,9-diphosphaspiro[5.5]undecane, tris(p-nonylphenyl)phosphite, 2,2',2"-nitrilo[triethyl-tris[3,3',5,5'-tetra-tertbutyl-1,1'-biphenyl-2'-diyl]phosphite], 3,9-distearyloxy-2,4,8,10-tetraoxa-3,9-diphosphaspiro[5.5] undecane, dilauryl phosphite, 3,9-di[2,6-di-tert-butyl-4-methyl-phenoxy]-2,4,8,10-tetraoxa-3,9-diphosphaspiro[5.5] undecane and tetrakis(2,4-di-tert-butylphenyl) 4,4'-bis (diphenylene)phosphonite, distearyl pentaerythritol diphosphite, diisodecyl pentaerythritol diphosphite, 2,4,6-tri-tert-butylphenyl-2-butyl-2-ethyl-1,3-propanediol phosphite, tristearyl sorbitol triphosphite, tetrakis(2,4-di-tert-butylphenyl)4,4'-biphenylene diphosphonite, (2,4,6-tri-tert-butylphenyl)-2-butyl-2-ethyl-1,3-propanediolphosphite, tri-isodecylphosphite, and mixtures of phosphites containing at least one of the foregoing. Tris(2,4-di-tert-butylphenyl) phosphite, 2,4,6-tri-tert-butylphenyl-2-butyl-2-ethyl-1,3-propanediol phosphite, bis(2,4di-tert-butylphenyl) pentaerythritol diphosphite are especially preferred, as well as mixtures of phosphites containing at least one of the foregoing phosphites, and the like.

Non-limiting examples of processing aids that can be used include Doverlube® FL-599 (available from Dover Chemical Corporation), Polyoxyter® (available from Polychem Alloy Inc.), Glycolube P (available from Lonza Chemical Company), pentaerythritol tetrastearate, Metablen A-3000 (available from Mitsubishi Rayon), neopentyl glycol dibenzoate, and the like.

Non-limiting examples of UV stabilizers that can be used include 2-(2'-Hydroxyphenyl)-benzotriazoles, e.g., the 5'-methyl-, 3',5'-di-tert.-butyl-, 5'-tert.-butyl-, 5'-(1,1,3,3-tetramethylbutyl)-, 5-chloro-3',5'-di-tert.-butyl-, 5-chloro-3'-tert.-butyl-5'-methyl-, 3'-sec.-butyl-5'-tert.-butyl-, 3'-alpha-methylbenzyl-5'-methyl, 3'-alpha-methylbenzyl-5'-methyl-5-chloro-, 4'-hydroxy-, 4'-methoxy-, 4'-octoxy-, 3',5'-di-tert.-amyl-, 3'-methyl-5'-carbomethoxyethyl-, 5-chloro-3',5'-di-tert.-amyl-derivative, and Tinuvin® 234 (available from Ciba Specialty Chemicals). 2,4-bis-(2'-Hydroxyphenyl)-6-alkyl-s-triazines, e.g., the 6-ethyl-, 6-heptadecyl- or 6-undecyl-derivative. 2-Hydroxybenzophenones e.g., the 4-hydroxy-, 4-methoxy-, 4-octoxy-, 4-decyloxy-, 4-dodecyloxy-, 4-benzyloxy-, 4,2',4'-trihydroxy-, 2,2',4,4'-tetrahydroxy- or 2'-hydroxy-4,4'-dimethoxy-derivative. 1,3-bis-(2'-Hydroxybenzoyl)-benzenes, e.g., 1,3-bis-(2'-hydroxy-4'-hexyloxy-benzoyl)-benzene, 1,3-bis-(2'-hydroxy-4'-octyloxy-benzoyl)-benzene or 1,3-bis-(2'-hydroxy-4'-dodecyloxybenzoyl)-benzene. Esters of optionally substituted benzoic acids, e.g., phenylsalicylate octylphenylsalicylate, dibenzoylresorcin, bis-(4-tert.-butylbenzoyl)-resorcin, benzoylresorcin, 3,5-di-tert.-butyl-4-hydroxybenzoic acid-2,4-di-tert.-butylphenyl ester or -octadecyl ester or -2-methyl-4,6-di-tert.-butyl ester. Acrylates, e.g., alpha-cyano-beta, beta-diphenylacrylic acid-ethyl ester or isooctyl ester, alpha-carbomethoxy-cinnamic acid methyl ester, alpha-cyano-beta-methyl-p-methoxy-cinnamic acid methyl ester or -butyl ester or N(beta-carbomethoxyvinyl)-2-methyl-indoline. Oxalic acid diamides, e.g., 4,4'-di-octyloxy-oxanilide, 2,2'-di-octyloxy-5,5'-di-tert.-butyl-oxanilide, 2,2'-di-dodecyloxy-5,5-di-tert.-butyl-oxanilide, 2-ethoxy-2'-ethyl-oxanilide, N,N'-bis-(3-dimethyl-aminopropyl)-oxalamide, 2-ethoxy-5-tert.-butyl-2'-ethyloxanilide and the mixture thereof with 2-ethoxy-2'-ethyl-5,4'-di-tert.-butyl-oxanilide, or mixtures of orlho- and para-methoxy- as well as of o- and p-ethoxy-disubstituted oxanilides. Preferably the ultraviolet light absorber used in the instant compositions is 2-(2-hydroxy-5-methylphenyl)-2H-benzotriazole, 2-(2-hydroxy-3,5-di-tert-amylphenyl)-2H-benzotriazole, 2-[2-hydroxy-3,5-di-(alpha,alpha-dimethylbenzyl)phenyl]-2H-benzotriazole, 2-(2-hydroxy-5-tert-octylphenyl)-2H-benzotriazole, 2-hydroxy-4-octyloxybenzophenone, nickel bis(O-ethyl 3,5-di-tert-butyl4-hydroxybenzylphosphonate), 2,4-dihydroxybenzophenone, 2-(2-hydroxy-3-tert-butyl-5-methylphenyl)-2H-benzotriazole, nickel butylamine complex with 2,2'-thiobis(4-tert-butylphenol), 2-ethoxy-2'-ethyloxanilide or 2-ethoxy-2'-ethyl-5,5'-ditert-butyloxanilide.

Non-limiting examples of fire retardants that can be used include potassium nonafluorobutylsulfonate, potassium diphenylsulfone sulfonate, and phosphite esters of polyhydric phenols, such as resorcinol and bisphenol A.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims. The disclosure is further illustrated by the following non-limiting examples.

Weight average molecular weight ($M_w$) was measured by gel permeation chromatography. Values quoted are relative to those measured for a polystyrene standard. Ductility was measured using IZOD impact measurement technique according to ISO 180. FR rating was measured using UL94 V0 test and 1.6 millimeter sample thickness.

Prophetic Example 1. This example describes the preparation of a low molecular weight hydroxy-endcapped bisphenol A homopolycarbonate having a weight average molecular weight of about 8,000. The procedure is also described as a part of Example 2 in Column 6, lines 27–42 of U.S. Pat. No. 6,143,859, which is incorporated herein by reference.

A 1-liter glass melt polymerization reactor is passivated by acid washing, rinsing with deionized water and dried overnight at about 70.° C. The reactor is then charged with 130.4 grams (608.6 millimoles) of diphenyl carbonate and 120 grams (525.6 millimoles) of bisphenol A. A solid nickel stirrer is suspended in the mixture, and the reactor is purged with nitrogen and heated to about 180.° C., whereupon the reaction mixture melts. Upon complete melting, it is allowed to equilibrate for 5–10 minutes, with stirring. Then with stirring, 600 microliters of a 0.221 Molar aqueous tetramethylammonium maleate solution and 500 microliters of a 0.01 Molar aqueous sodium hydroxide solution are added. The resulting mixture is heated at about 180° C. and stirring is continued for about 5 minutes, after which the temperature is raised to about 210° C. and the pressure is decreased to about 180 millimeters of mercury, whereupon phenol begins to distill. After about 10 minutes, the desired low molecular weight bisphenol A homopolycarbonate is produced.

Example 2. A typical composition used for the extrusion and molding operations is shown below in Table 1. The numbers indicate the parts by weight of each component per 100 parts of the overall mixture formed by combining all of the indicated components. The indicated amounts of the ingredients were weighed carefully and mixed uniformly using a Banbury type mixer. PC-ST refers to the polyorganosiloxane-polycarbonate block copolymer having a weight average molecular weight of about 60,000 and represented by formula (VI), as shown previously. In all of the examples that follow, the block copolymer represented by formula (VD) has values for "c", "d" and "e" such that the copolymer has a weight average molecular weight about 60,000.

The resulting mixture was then extruded to form pellets, which were molded using the BORG mold, which is described, for example in World Patent Application No. 0067004 A1, which is incorporated herein by reference.

TABLE 1

| Material | Weight percent loading |
|---|---|
| PC-ST | 21.5 |
| Bisphenol A homopolycarbonate of weight average molecular weight of about 57,000 | 37.1 |
| Bisphenol A homopolycarbonate of weight average molecular weight of about 40,000 | 37.2 |
| Antioxidant | 0.086 |

TABLE 1-continued

| Material | Weight percent loading |
|---|---|
| Heat Stabilizer | 0.029 |
| UV stabilizer | 0.029 |
| Fire retardant | 0.029 |
| Brown color package | 0.38 |
| Polyethylene glycol (Average molecular weight of about 200) | 0.048 |
| Hydroxy-endcapped bisphenol A (Weight average molecular weight of about 8000) | 2.4 |

Compounding was carried out using W&P ZSK 25 Laboratory Twin-Screw Extruder with standard screw design for polycarbonate polymers. Compounding conditions are given in Table 2. Injection moldings were carried out using L&T Demag De-Tech 60 LNC4-E molding machine. Molding conditions are given in Table 3. The abbreviation "RPM" stands for revolutions per minute. The abbreviation "psi" stands for pounds per square inch. Table 4 shows the results obtained from molding thermoplastic polymer compositions comprising various types of flow modifiers. The amounts of the flow modifiers are shown as parts per 100 parts of the molding composition. The flow modifiers used are identified as follows: A: Silicone oil (approximate molecular weight of 1000); B: Low density polyethylene (represented as "LDPE" having a melt density of about 0.92 gram/cubic centimeter and a melt volume rate of about 2.2 cubic centimeters/10 minutes; C: Polyethylene glycol of number average molecular weight of about 200; D: bisphenol A homopolycarbonate of weight average molecular weight of about 8000; E: Dioctyl phthalate; and F: polytetrafluoroethylene (20% emulsion). The surface imperfection rating is given relative to what is seen in the absence of a flow modifier.

The loading figures represent parts by weight of the flow modifier per 100 parts of the molding composition. Surface imperfection was evaluated by visual examination as compared with the molding composition containing no flow modifier. Table 5 shows the results obtained from thermoplastic polymer moldings obtained with various combinations of the flow modifiers, C and D, described hereinabove. The amounts of the flow modifiers are shown as parts per 100 parts of the molding composition. The melt volume rate (MVR) is expressed in terms of cubic centimeters/10 minutes (cc/10 min). Fire retardance data is shown under the column labeled "FR". "NA" indicates that data is not available. The term ΔL refers to the percent shift in color index of the molded plaque upon addition of the flow modifier, relative to the control example 16, where no flow modifier was added.

TABLE 2

| Process Parameter | Value |
|---|---|
| Temperature Feeding Zone | 93° C. |
| Temperature Zone 1 | 121° C. |
| Temperature Zone 2 | 260° C. |
| Temperature Zone 3 | 271° C. |
| Temperature Zone 4 | 282° C. |
| Temperature of Throat/Die | 289° C. |
| Vacuum Applied? | Yes |
| Screw Speed | 400 RPM |
| Temperature of Melt | 321° C. |
| Current/Torque | About 80 Amperes |

TABLE 3

| Process Parameter | Value |
|---|---|
| Temperature Feeding Zone | 93° C. |
| Temperature Zone 1 | 277° C. |
| Temperature Zone 2 | 288° C. |
| Temperature Zone 3 | 299° C. |
| Temperature of Nozzle | 299° C. |
| Temperature of Melt | 299° C. |
| Temperature of Mold | 82° C. |
| Sample Drying Time | 4 Hours |
| Sample Drying Temperature | 121° C. |
| Cycle Time | 35 Seconds |
| Injection time | 6 Seconds |
| Injection Speed | About 1 inch/second |
| Injection Pressure | 1100 Psi |
| Decompression | 1 Inch |
| Switch Point | 0.25 Inch |
| Screw Speed | 100 RPM |
| Holding Pressure | 600 Psi |
| Holding Time | 10 Seconds |
| Cooling Time | 25 Seconds |

TABLE 4

| Example No. | Additive | Flow modifier Loading | Surface imperfection |
|---|---|---|---|
| 2 | A | 1 | Worse knit lines |
| 3 | B | 1 | Worse knit lines |
| 4 | C | 0.5 | Reduced knit lines |
| 5 | C | 1.0 | Reduced knit lines |
| 6 | D | 5 | Reduced knit lines |
| 7 | D | 20 | Reduced knit lines |
| 8 | E | 1 | Worse knit lines |
| 9 | F | 1 | Worse knit lines |

TABLE 5

| Example No. | Amount of flow modifier "C" | Amount of flow modifier "D" | ΔL (%) | MVR (cc/10 min) | FR rating | Ductility at −40° C. (%) |
|---|---|---|---|---|---|---|
| 10 | 0.4 | 2.5 | 57 | 35 | V0 | 100 |
| 11 | 0.6 | 3 | 72 | 39 | V0 | 100 |
| 12 | 0 | 5 | 31 | 15 | V0 | 100 |
| 13 | 0.5 | 0 | 30 | 28 | V0 | 100 |
| 14 | 0.5 | 2.5 | 69 | 40 | V0 | 100 |
| 15 | 0 | 2.5 | 23 | NA | V0 | 100 |
| 16 | 0 | 0 | 0 | 9 | V0 | 100 |

The results obtained show that molding compositions comprising a polyethylene glycol, a low molecular weight bisphenol A homopolycarbonate, or combinations thereof as the flow modifier give moldings having reduced imperfections on the surface. Furthermore, the addition of these effective additives does not significantly affect the physical properties of the polymer molding compositions and molded articles derived therefrom, While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims. All Patents cited herein are incorporated herein by reference.

What is claimed is:

1. A thermoplastic polymer molding composition useful for producing an article, said molding composition comprising:
a polyorganosiloxane-polycarbonate block copolymer, and a flow modifier; wherein said flow modifier is selected from the group consisting of a polyalkylene glycol compound, and a mixture of a polyalkylene glycol and a low molecular weight polycarbonate, wherein said low molecular weight polycarbonate has a weight average molecular weight from about 1,000 to about 10,000, and the amount of flow modifier added is in an amount effective to reduce surface imperfections if the molding composition is molded into an article.

2. The molding composition of claim 1, wherein said molding composition further comprises at least one second polycarbonate polymer.

3. The molding composition of claim 1, wherein each 100 parts of said molding composition comprises from about 0.05 parts to about 20 parts of said flow modifier.

4. The molding composition of claim 2, wherein said at least one second polycarbonate is not a polyorganosiloxane-polycarbonate block copolymer.

5. The molding composition of claim 1, wherein said polyorganosiloxane-polycarbonate block copolymer comprises:
polyorganosiloxane blocks having the formula:

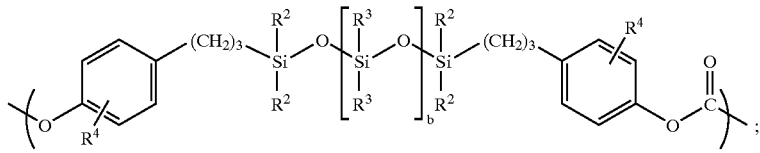

wherein $R^2$ and $R^3$ are each independently hydrogen, hydrocarbyl or halogen-substituted hydrocarbyl; $R^4$ is hydrogen, hydrocarbyl, hydrocarbyloxy, or halogen; and "b" is an integer having a value from about 30 to about 70; and
polycarbonate blocks having the formula:

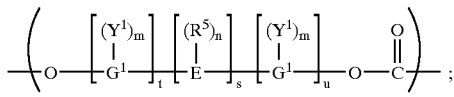

wherein $G^1$ is an aromatic group; E is an alkylene, and alkylidene, a cycloaliphatic group; a sulfur-containing linkage, a phosphorus-containing linkage; an other linkage, a carbonyl group, or a tertiary nitrogen group, where $R^5$ is a hydrogen or a monovalent hydrocarbon group; wherein $Y^1$ is selected from the group consisting of, a monovalent hydrocarbon group, alkenyl, allyl, halogen, bromine, chlorine; nitro; wherein "m" represents any integer from and including zero through the number of positions on $G^1$ available for substitution; wherein "n" represents an integer from and including zero through the number of positions on E available for substitution; wherein "t" represents an integer equal to at least one; wherein "s" is either zero or one; and wherein "u" represents any integer including zero.

6. The molding composition of claim 5, wherein said polycarbonate blocks are derived from the group consisting of 4,4'-(3,5-trimethylcyclohexylidene)diphenol, 4,4'-bis(3, 5-dimethyl)diphenol, 1,1-bis(4-hydroxy-3-methylphenyl) cyclohexane, 4,4-bis(4-hydroxyphenyl)heptane, 2,4'-dihydroxydiphenylmethane, bis(2-hydroxyphenyl)methane, bis(4-hydroxyphenyl)methane, bis(4-hydroxy-5-nitrophenyl)methane, bis(4-hydroxy-2,6-dimethyl-3-methoxyphenyl)methane, 1,1-bis(4-hydroxyphenyl)ethane, 1,1-bis(4-hydroxy-2-chlorophenyl)ethane, 2,2-bis(4-hydroxyphenyl)propane, 2,2-bis(3-phenyl-4-hydroxyphenyl)propane, 2,2-bis(4-hydroxy-3-methylphenyl)propane, 2,2-bis(4-hydroxy-3-ethylphenyl) propane, 2,2-bis(4-hydroxy-3-isopropylphenyl)propane, 2,2-bis(4-hydroxy-3,5-dimethylphenyl)propane, 2,2-bis(3, 5,3',5'-tetrachloro-4,4'-dihydroxyphenyl)propane, bis(4-hydroxyphenyl)cyclohexylmethane, 2,2-bis(4-hydroxyphenyl)-1-phenylpropane, 2,4'-dihydroxyphenyl sulfone, 2,6-dihydroxy naphthalene; hydroquinone; resorcinol, $C_{1-3}$ alkyl-substituted resorcinols, 3-(4-hydroxyphenyl)-1,1,3-trimethylindan-5-ol, 1-(4-hydroxyphenyl)-1,3,3-trimethylindan-5-ol, 2,2,2',2'-tetrahydro-3,3,3',3'-tetramethyl-1,1'-spirobi[1H-indeno]-6, 6'-diol, 1-methyl-1,3-bis(4hydroxyphenyl)-3-isopropylcyclohexane, 1-methyl-2-(4-hydroxyphenyl)-3-[1-(4-hydroxyphenyl)isopropyl]cyclohexane, and combinations thereof; and combinations comprising at least one of the foregoing bisphenols.

7. The molding composition of claim 1, wherein said polyorganosiloxane-polycarbonate block copolymer has a weight average molecular weight from about 20,000 to about 80,000.

8. The molding composition of claim 1, wherein said polyorganosiloxane-polycarbonate block copolymer has a weight average molecular weight from about 30,000 to about 60,000.

9. The molding composition of claim 2, wherein said at least one second polycarbonate polymer has weight average molecular weight from about 20,000 to about 80,000.

10. The molding composition of claim 2, wherein said at least one second polycarbonate polymer comprises structural unit derived from at least one bisphenol of the formula:

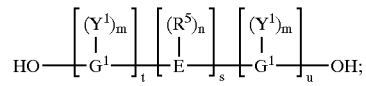

wherein $G^1$ is an aromatic group; wherein E is an alkylene, and alkylidene, a cycloaliphatic group; a sulfur-containing linkage, a phosphorus-containing linkage; an other linkage, a carbonyl group, or a tertiary nitrogen group, wherein $R^5$ is a hydrogen or a monovalent hydrocarbon group; wherein $Y^1$ is selected from the group consisting of a monovalent hydrocarbon group, alkenyl, allyl, halogen, bromino, chlorine; nitro; wherein "m" represents any integer from and including zero through the number of positions on $G^1$ available for substitution; wherein "n" represents an integer from and including zero through the number of position on E available for substitution; wherein "t" represents an integer equal to at least one; wherein "s" is either zero or one; and wherein "u" represents any integer including zero.

11. The molding composition of claim 10, wherein said bisphenol is selected from the group consisting of 4,4'-(3,3,5-trimethylcyclohexylidene)diphenol, 4,4'-bis(3,4-dimethyl)diphenol, 1,1-bis(4-hydroxy-3-methylphenyl)cyclohexane, 4,4-bis(4-hydroxyphenyl)heptane, 2,4'-dihydroxydiphenylmethane, bis(2-hydroxyphenyl)methane, bis(4hydroxyphenyl)methane, bis(4-hydroxy-5-nitrophenyl)methane, bis(4-hydroxy-2,6-dimethyl-3-methoxyphenyl)methane, 1,1-bis(4-hydroxyphenyl)ethane, 1,1-bis(4-hydroxy-2-chlorophenyl)ethane, 2,2-bis(4-hydroxyphenyl)propane, 2,2-bis(3-phenyl-4-hydroxyphenyl)propane, 2,2-bis(4-hydroxy-3-methylphenyl)propane, 2,2-bis(4hydroxy-3-ethylphenyl)propane, 2,2-bis(4-hydroxy-3-isopropylphenyl)propane, 2,2-bis(4-hydroxy-3,5-dimethylphenyl)propane, 2,2-bis(3,5,3',5'-tetrachloro-4,4'-dihydroxyphenyl)propane, bis(4-hydroxyphenyl)cyclohexylmethane, 2,2-bis(4hydroxyphenyl)-1-phenylpropane, 2,4'-dihydroxyphenyl sulfone, 2,6-dihydroxy naphthalene; hydroquinone; resorcinol, $C_{1-3}$ alkyl-substituted resorcinols, 3-(4-hydroxyphenyl)-1,1,3-trimethylindan-5-ol, 1-(4-hydroxyphenyl)-1,3,3-trimethylindan-5-ol, 2,2,2',2'-tetrahydro-3,3,3',3'-tetramethyl-1,1'-spirobi[1H-indeno]-6,6'-diol, 1-methyl-1,3-bis(4hydroxyphenyl)-3-isopropylcyclohexane, 1-methyl-2-(4-hydroxyphenyl)-3-[1-(4-hydroxyphenyl)isopropyl]cyclohexane, and combinations thereof; and combinations comprising at least one of the foregoing bisphenols.

12. The molding composition of claim 1, wherein said polycarbonate polymer has a weight average molecular weight from about 3,000 to about 8,000.

13. The molding composition of claim 1, wherein said low molecular weight polycarbonate polymer is derived from a bisphenol selected from the group consisting of 4,4'-(3,3,5-trimethylcyclohexylidene)diphenol, 4,4'-bis(3,5-dimethyl)diphenol, 1,1-bis(4-hydroxy-3-methylphenyl)cyclohexane, 4,4'-bis(4-hydroxyphenyl)heptane, 2,4'-dihydroxydiphenylmethane, bis(2-hydroxyphenyl)methane, bis(4-hydroxyphenyl)methane, bis(4-hydroxy-5-nitrophenyl)methane, bis(4-hydroxy-2,6-dimethyl-3-methoxyphenyl)methane, 1,1-bis(4-hydroxyphenyl)ethane, 1,1-bis(4-hydroxy-2-chlorophenyl)ethane, 2,2-bis(4-hydroxyphenyl)propane, 2,2-bis(3-phenyl-4-hydroxyphenyl)propane, 2,2-bis(4-hydroxy-3-methylphenyl)propane, 2,2-bis(4-hydroxy-3-ethylphenyl)propane, 2,2-bis(4-hydroxy-3-isopropylphenyl)propane, 2,2-bis(4-hydroxy-3,5-dimethylphenyl)propane, 2,2-bis(3,5,3',5'-tetrachloro-4,4'-dihydroxyphenyl)propane, bis(4-hydroxyphenyl)cyclohexylmethane, 2,2-bis(4hydroxyphenyl)-1-phenylpropane, 2,4'-dihydroxyphenyl sulfone, 2,6-dihydroxy naphthalene; hydroquinone; resorcinol, $C_{1-3}$ alkyl-substituted resorcinols, 3-(4-hydroxyphenyl)-1,1,3-trimethylindan-5-ol, 1-(4-hydroxyphenyl)-1,3,3-trimethylindan-5-ol, 2,2,2',2'-tetrahydro-3,3,3',3'-tetramethyl-1,1'-spirobi[1H-indene]-6,6'-diol, 1-methyl-1,3-bis(4-hydroxyphenyl)-3-isopropylcyclohexane, 1-methyl-2-(4-hydroxyphenyl)-3-[1-(4-hydroxyphenyl)isopropyl]cyclohexane, and combinations thereof; and combinations comprising at least one of the foregoing bisphenols.

14. The molding composition of claim 1, wherein said polyalkylene glycol compound has a repeat unit having the formula:

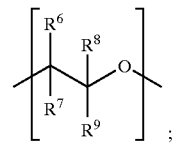

wherein $R^6$, $R^7$, $R^8$, and $R^9$ each independently represents a hydrogen or a $C_1$–$C_4$ alkyl radical; and terminal group selected from $OR^{10}$, wherein $R^{10}$ is hydrogen, $C_1$–$C_4$ hydrocarbyl.

15. The molding composition of claim 1, wherein said polyalkylene glycol is selected from the group consisting of a polyethylene glycol, a polypropylene glycol, or mixtures thereof.

16. The molding composition of claim 15, wherein said polyethylene glycol has a number average molecular weight from about 150 to about 2000.

17. The molding composition of claim 1, wherein said article has a percent shift increase in color index of at least about 10 percent, relative to an otherwise similar molding composition which does not comprise said flow modifier.

18. The molding composition of claim 1, wherein said molding composition has a melt volume rate from about 15 to about 45.

19. An article comprising a thermoplastic polymer molding composition, wherein said molding composition comprises:

a polyorganosiloxane-polycarbonate block copolymer;

at least one polycarbonate polymer; and a flow modifier selected from the group consisting of a polyalkylene glycol and a mixture of a polyalkylene glycol and a low molecular weight polycarbonate, wherein the low molecular weight polycarbonate has a weight average molecular weight from about 1,000 to about 10,000; wherein said article has a percent shift increase in color index of at least about 10 percent, relative to an otherwise similar molding composition which does not comprise said flow modifier.

20. A thermoplastic polymer molding composition useful for producing an article, wherein each 100 parts of said molding composition comprises:

a polyorganosiloxane-polycarbonate block copolymer having a weight average molecular weight from about 28,000 to about 32,000;

a bisphenol A homopolycarbonate having a weight average molecular weight from about 30,000 to about 60,000; and from about 0.2 parts to about 5 parts of a flow modifier selected from the group consisting of a polyalkylene glycol, and a mixture of a polyalkylene glycol and a polycarbonate, wherein the polycarbonate has a weight average molecular weight from about 1,000 to about 10,000, wherein said polyorganosiloxane-polycarbonate block copolymer comprises:

polyorganosiloxane blocks having the formula:

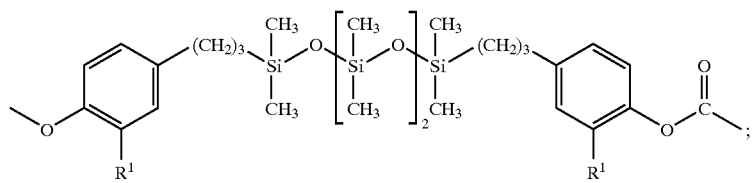

wherein $R^1$ is hydrogen, methoxy or allyl, "a" is an integer having a value from about 40 to about 55; and polycarbonate blocks having the formula:

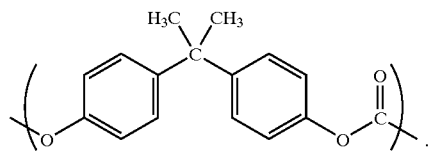

21. The molding composition of claim 20, wherein said polycarbonate is a bisphenol A homopolycarbonate having a weight average molecular weight from about 3,000 to about 8,000.

22. The molding composition of claim 20, wherein the polyalkylene glycol is polyethylene glycol having a number average molecular weight from about 200 to about 800.

* * * * *